United States Patent [19]
Sendelweck

[11] Patent Number: 4,894,725
[45] Date of Patent: Jan. 16, 1990

[54] BIASING CLAMP FOR A CRT

[75] Inventor: Gene K. Sendelweck, Indianapolis, Ind.

[73] Assignee: RCA Licensing Corporation, Princeton, N.J.

[21] Appl. No.: 167,750

[22] Filed: Mar. 15, 1988

[51] Int. Cl.$^4$ .......................... H04N 5/44; H04N 5/68
[52] U.S. Cl. ..................... 358/243; 358/188; 358/184
[58] Field of Search .............. 358/184, 188, 173, 242, 358/243

[56] References Cited

U.S. PATENT DOCUMENTS

| | | | |
|---|---|---|---|
| 3,449,619 | 6/1969 | Stalp | 358/242 |
| 4,218,720 | 8/1980 | Kam | 358/243 |
| 4,577,234 | 3/1986 | Harlan | 358/243 |
| 4,604,647 | 8/1986 | Peele | 358/242 |
| 4,631,595 | 12/1986 | George | 358/243 |
| 4,639,785 | 1/1987 | Tallant | 358/184 |
| 4,704,631 | 11/1987 | Bell | 358/188 |

OTHER PUBLICATIONS

RCA Color Television Service Data 1987 CTC140 p. 2–4.

Primary Examiner—Tommy P. Chin
Attorney, Agent, or Firm—Joseph S. Tripoli; Peter M. Emanuel; Thomas F. Lenihan

[57] ABSTRACT

A diode clamp in a kine driver circuit clamps the voltage at the grid (G1) element of a picture tube to a level derived from the voltage at the cathode element of the picture tube. Deriving the grid (G1) voltage from the cathode voltage ensures that if the kine driver amplifier saturates, the voltage applied to the grid (G1) will always be less than that applied to the cathode. Thus, excessive beam current is prevented from flowing immediately following cold cathode turn-on, which excessive beam current would otherwise cause a phenomenon known as "focus flutter".

5 Claims, 2 Drawing Sheets

BIASING CLAMP FOR A CRT

FIELD OF THE INVENTION

This invention relates to the field of picture tube (kine) driver circuits.

BACKGROUND OF THE INVENTION

As used herein the terms cathode ray tube (CRT), picture tube, and kine have the same meaning and are used interchangeably.

Modern television receivers differ from their predecessors in that the discrete circuitry of the older models is being replaced with integrated circuitry capable of performing ever more and complex functions. Some advantages inherent in employing integrated circuits include lower manufacturing costs due to few parts to stock and assemble, greater reliability, less circuit board space needed, and fewer solder connections. One integrated circuit (IC) is the Luma/Chroma IC used by RCA in the CTC 140 chassis.

As the number of functions performed by an IC increases, the circuitry on the IC becomes more densely packed with the result that the power dissipation undesirably increases. One way to limit the power dissipation of an IC is to limit its output voltage swing to lower values than was necessary for less densely packed ICs. For example, a relatively complex IC may have an output voltage swing of 2.2 volts peak-to-peak as compared to less complex integrated circuits which may have typical output voltage swings of 3.3 volts peak-to-peak.

In order to compensate for a reduction of signal level, it may be necessary for the kine driver circuitry to be operated at higher gain levels to produce a satisfactory picture. For example, it may be necessary to increase the gain of a kine driver circuit from approximately 40 to approximately 60.

It is herein recognized that unfortunately, operating the kine driver circuits at a higher gain may cause a new problem that the Applicant calls focus flutter.

Focus flutter occurs shortly after a television receiver is turned on as follows. When power is first applied to a television receiver the CRT filament is cold and there is no emission from the cathodes. There is therefore no beam current, causing the tube cathodes to appear as open circuits. Since there is no beam current, the beam current limiter does not reduce contrast or brightness. Therefore, since at maximum contrast control setting the video output signal from the IC is amplified to the greatest extent, and there is no beam current flowing, the high gain kine drivers will saturate.

In normal operation, the cathode potential is about 150-160 volts higher than the grid (G1) potential and beam current is, as a result, held within a normal range. However, the above-described condition of kine driver saturation causes the cathode voltage to fall to a level at or below the level of the voltage on the grid (G1) to produce a so called "zero bias" condition. In this "zero bias" condition, when the CRT filament has heated the cathodes enough to have emission, excessive beam current will begin to flow.

With some picture tubes, excessive beam current can be partially intercepted by the focus electrode, causing focus current to flow. This, in turn, causes the focus voltage to drop, and defocuses the beam, causing even more beam current to strike the focus electrode. This positive feedback phenomenon manifests itself as a brightness fluctuation of the picture.

The focus flutter problem occurs typically for 1 to 2 seconds after approximately an 8 second warm-up delay, during a turn-on with a white field when the brightness and/or contrast controls are set to their maximum positions. The problem is relieved after 1 to 2 seconds because, as the beam current begins to flow, the kine drivers come out of saturation and the zero bias condition disappears.

The problem of focus flutter is a function of the geometry of the electron gun assembly of the CRT. Specifically, it has been found that the problem probably will not be exhibited with 20 inch (diagonal measure) picture tubes, such as the RCA A51ACG14X, while the problem is likely to be exhibited with 26 inch (diagonal measure) picture tubes, such as the RCA A66ADT14X. Therefore, it would seem that the problem could be alleviated by redesigning the electron gun assembly of the picture tube. That solution, however, is undesirable because the same type of picture tube is typically used with many different chasses, some of which may not use high gain kine drivers and therefore not have the problem. Moreover, there is a the high cost associated with producing new picture tubes.

SUMMARY OF THE INVENTION

It is herein recognized that the focus flutter may be prevented by clamping the grid (G1) electrode of a CRT to a potential divided down from that of the cathode in order to prevent the above described zero bias condition and thereby prevent the initial beam current at cold cathode turn-on from being excessive.

DETAILED DESCRIPTION OF THE DRAWING

Figure 1:
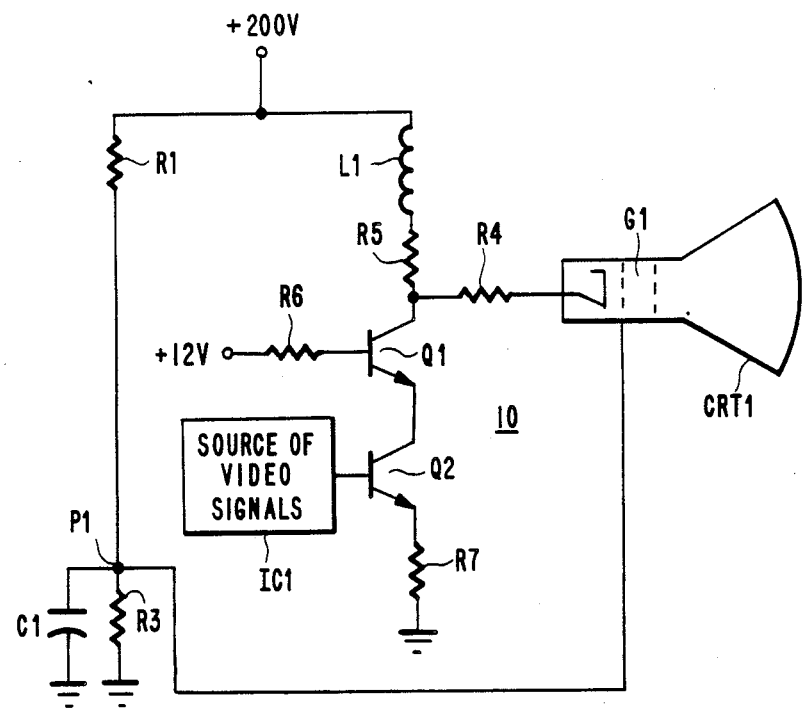
FIG. 1 illustrates in schematic form a typical kine driver circuit in the prior art.
Figure 2:
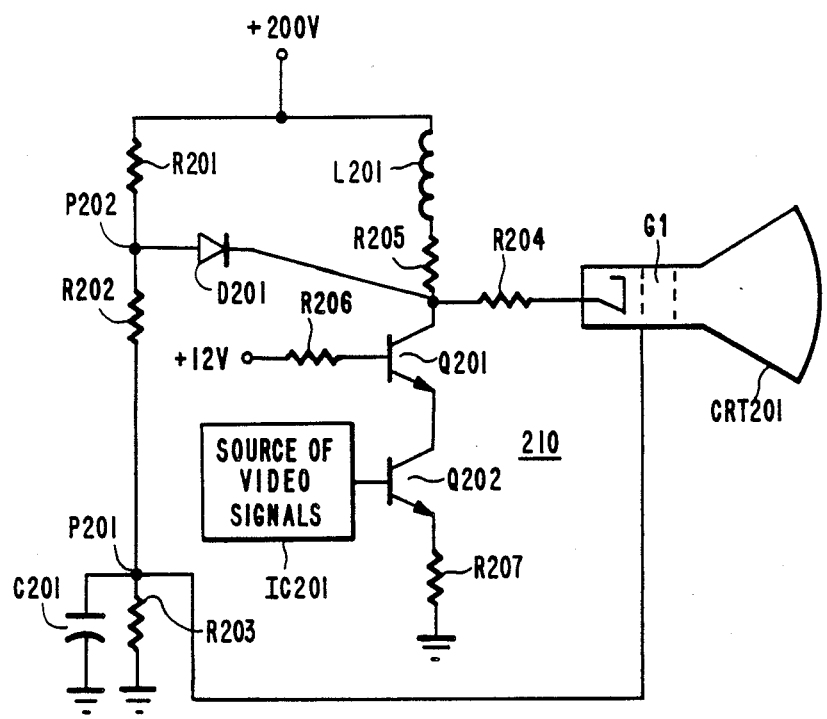
FIG. 2 illustrates i schematic form a kine driver circuit embodying the invention.

Referring to FIG. 1, a picture tube (CRT1) is of the "unitized gun" type (i.e. having only a single grid (G1) element which is common to all three cathodes). Grid (G1) is coupled to the center point (P1) of a voltage divider comprising resistors R1 and R3. Voltage divider R1,R3 is connected between a source of positive potential (+200V) and a source of reference potential (ground), the voltage at the center point P1 of voltage divider R1,R3 being approximately 30 volts. The voltage at the center point (P1) is filtered by capacitor C1 to prevent slight variations of the 200 volt source from affecting the voltage level at grid (G1) which would cause undesirable fluctuations of beam current, and adversely affect picture quality. CRT1 also has a cathode element coupled via a coupling resistor R4 to a kine driver 10, comprising cascode connected transistors Q1 and Q2. The collector of transistor Q1 is connected to the cathode element of CRT1 and is also coupled to the 200 volt source via a resistor R5 and an inductor L1. The base of transistor Q1 is coupled to a 12 volt source via resistor R6 to provide proper bias. The emitter of transistor Q1 is coupled to the collector of transistor Q2 having an emitter coupled to ground via resistor R7, and a base electrode to which video signals to be displayed are applied from a source of video signals (IC1). While FIGS. 1 and 2 show a CRT having a single cathode element for simplicity, it is understood that color picture tubes typically have a separate cathode element for each of the colors red, green and blue. The circuitry thus far described is known, for example, from RCA Color Television Service Data manual 1987 CTC140.

As noted above, in operation, grid (G1) is impressed with approximately 30 volts, and the cathode electrode is operated at a level of approximately 190 volts, thus establishing a −160 volt bias potential between grid (G1) and the cathode. If the above described circuitry were modified by substituting a source of video signals having a limited output voltage swing for the source of video signals IC1, and by correspondingly increasing the gain of kine driver 10, then during a cold cathode turn-on of the receiver, kine driver amplifier 10 would tend to saturate as described above, causing the grid (G1) - cathode circuit to "zero bias" due to the voltage at the collector of Q1 falling to a level equal to the voltage level on the grid (G1).

The subject invention will now be described with reference to FIG. 2 in which components having a similar function to those already described with respect to FIG. 1 bear similar numbers but increased by 200. Note that the source of video signals IC201 is an integrated circuit having increased complexity and lower peak-to-peak output signal than the source of video signals IC1 of FIG. 1, and kine driver 210 of FIG. 2 is correspondingly a higher gain amplifier than kine driver 10 of FIG. 1. The kine driver circuit chosen to be modified with the invention is the red driver circuit because the red driver circuit typically has the highest gain and thus turns-on first.

The voltage divider of FIG. 2 comprises 3 resistors R201, R202 and R203 having a first connection point P201 between resistors R202 and R203, and a second connection point P202 between resistors R201 and R202. A diode D201 is coupled between the collector of transistor Q201 and voltage divider connection point P202. This connects the cathode and grid (G1) of CRT 201 to different points on the same voltage divider network and ensures that the grid (G1) electrode is always at a lower potential than the cathode as follows.

Diode D201 is oriented such that its anode is coupled to connection point P202 at which is developed approximately 43 volts. Since the collector of transistor Q1 is normally at 190 volts diode D201 is usually reversed biased. At cold cathode turn-on, however, when the collector of Q201 falls to 43 volts minus the forward voltage drop (0.7v) of diode D201, diode D201 is biased into conduction. Under these conditions, the collector of transistor Q201 ultimately falls to about +12v and hence the cathode electrode of CRT201 is also at approximately 12v. During this time, point P202 is pulled to about 12.7v through diode D201, and sets the divided down grid (G1) voltage at about 8 volts. The −4 volt bias (8 volt grid (G1) voltage - 12 volt cathode voltage=−4v bias) is enough to limit the beam current during cold cathode turn-on and prevent the problem of focus flutter from occurring. It is important to note that the invention does not prevent saturation of the kine driver circuitry because the diode 201 is returned through high value resistor R201 (typically 2.7 Megohms). Rather, the mechanism which is employed to prevent the zero-bias condition is to clamp the grid (G1) voltage to a voltage which is divided from the cathode voltage, and thus always lower than the cathode voltage.

It is noted that some manufacturers of CRTs have recommended that their CRTs never be operated at zero bias because this excessive beam current will flow which may damage or destroy the CRT. The clamp diode of the present invention is suitable for ensuring that such CRTs are never operated at zero bias, and thus provides solution to this later problem in addition to solving the focus flutter problem described above.

As noted above, when a CRT having a unitized gun is used, it is unnecessary to modify all three cathode circuits because with the kine driver amplifier having the highest gain (i.e., the red driver) connected as shown, when it saturates, the grid voltage for all three guns is pulled down. However, the invention is also suitable for use with CRTs having a separate grid (G1) element for each cathode, in which case the invention as shown in FIG. 2 should be incorporated into each kine driver circuit.

What is claimed is:

1. In a television receiver, apparatus, comprising:
    a picture tube having a cathode element and a grid (G1) element; and
    a kine driver circuit including,
    an amplifier means having an input terminal for receiving video signals to be amplified, and an output terminal coupled to said cathode element, at which output terminal amplified signals and an output voltage level are developed, said picture tube being susceptible to periods of excessive beam current in response to said amplified signals and said output voltage level;
    means for applying a bias voltage to said grid (G1) element; and
    diode means coupled between said grid (G1) element and said cathode element and having a conductive state wherein said beam current is limited and having a non-conductive state, said diode means being responsive to said output voltage level at said cathode element for maintaining said bias voltage on said grid (G1) element at a level lower than said output voltage level at said cathode element.

2. In a television receiver, apparatus, comprising:
    a picture tube having a cathode element and a grid (G1) element; and
    a kine driver circuit including an amplifier having an input terminal for receiving signals to be amplified, and an output terminal coupled to said cathode element of said picture tube, at which output terminal amplified signals are developed;
    voltage divider means comprising a first resistive portion, a second resistive portion, and a third resistive portion coupled in series between a source of supply voltage and a source of reference potential, said grid (G1) element of said picture tube being coupled to the junction of said second and third resistive portions of said voltage divider means, for receiving a grid (G1) bias voltage therefrom; and
    voltage clamping means coupled between the junction of said first and second resistive portions of said voltage divider means and said output terminal of said amplifier for causing said grid (G1) bias voltage to be maintained at a value less than the voltage level developed at same output terminal of said amplifier.

3. A kine driver circuit, comprising:
    amplifier means having an input terminal for receiving video signals to be amplified, and an output terminal at which said amplified signals are developed and to which a cathode element of a kine may be connected;

voltage divider means having a first resistive portion, a second resistive portion, and a third resistive portion coupled in series between a source of supply voltage and source of reference potential, wherein the connection point between said second and third resistive portions of said voltage divider means is a point to which a grid (Gl) element of said kine may be connected for receiving a bias voltage; and voltage clamping means coupled between the junction of said first and second resistive portions of said voltage divider means and said output terminal of said amplifier for causing said grid (Gl) bias voltage to be clamped to a value less than the voltage level developed at said output of said amplifier.

4. The kine driver circuit of claim 3 wherein said clamping means includes a diode.

5. The kine driver circuit of claim 4 wherein said amplifier means comprises a transistor and said output terminal is the collector electrode of said transistor.

* * * * *